June 25, 1946.    D. K. ALLISON    2,402,719
APPARATUS FOR INDICATING HORSEPOWER
Filed June 26, 1942
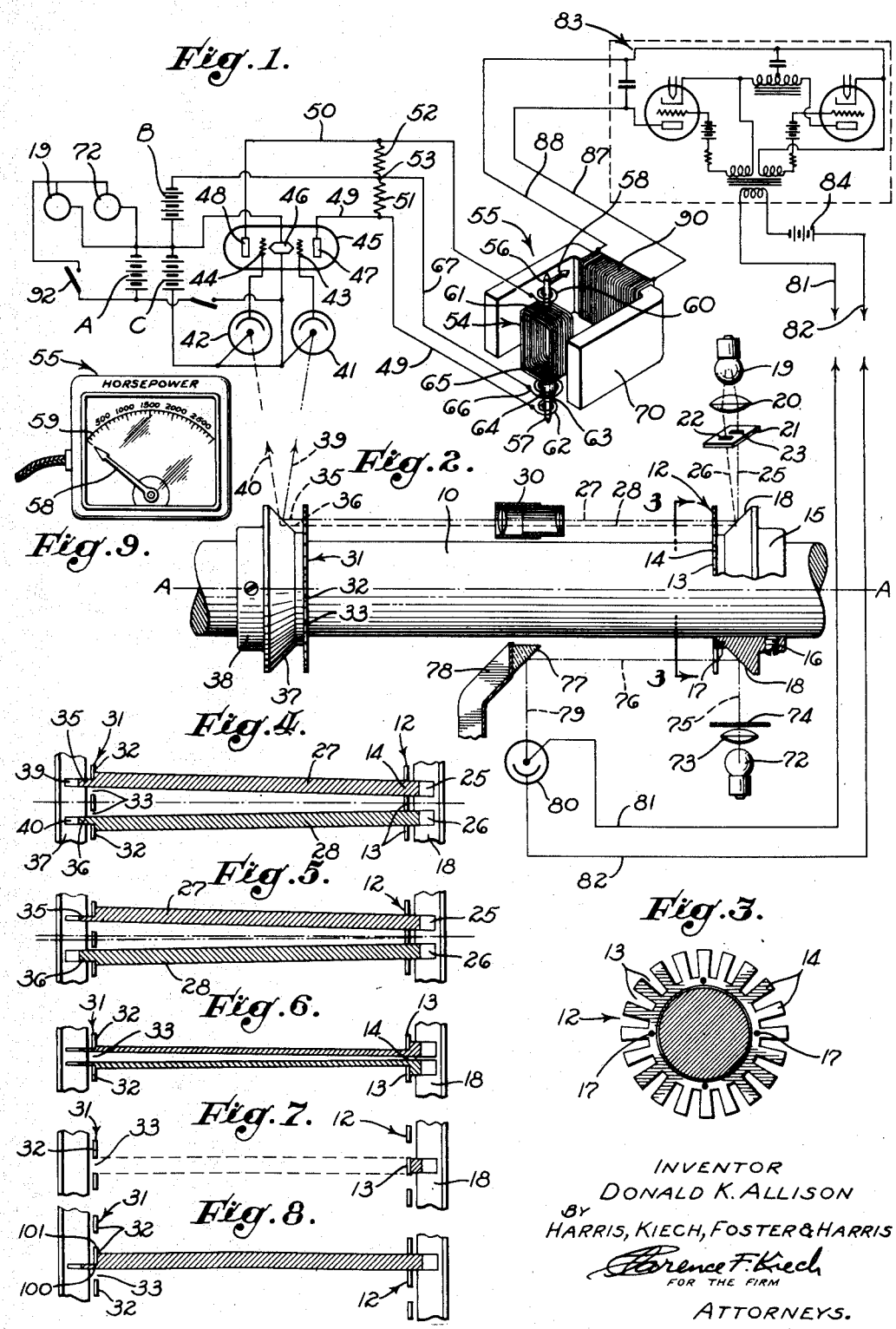
INVENTOR
DONALD K. ALLISON
BY
HARRIS, KIECH, FOSTER & HARRIS
*Florence F. Kiech*
FOR THE FIRM
ATTORNEYS.

Patented June 25, 1946

2,402,719

UNITED STATES PATENT OFFICE 2,402,719

APPARATUS FOR INDICATING
HORSEPOWER

Donald K. Allison, Beverly Hills, Calif.

Application June 26, 1942, Serial No. 448,675

7 Claims. (Cl. 73—136)

My invention relates to an apparatus for determining torque or power transmitted by a rotating shaft and giving an indication thereof.

It has long been a desideratum to be able to measure torque or horsepower being transmitted by a shaft. Torque-determinative systems have been developed requiring electrical connections to and from the shaft and requiring complex electrical equipment, but such systems are open to many difficulties and have not found wide commercial usage. It is an object of the present invention to provide a novel method and apparatus for torque determination which is relatively simple and free of troublesome electrical connections to the shaft.

The problem of indicating directly the horsepower transmitted by a shaft (i. e., torque times revolutions per minute) is even more complex and has never been solved satisfactorily. It would be most desirable to have a direct-reading horsepower meter on many shafts, particularly those subjected to variations in torque, which might increase to a dangerous magnitude. This is true, for example, in line-shaft-drive types of airplanes where the power is transmitted from the engine to the propeller through a relatively long (and desirably minimum weight) shaft, and where the correlation between engine and propeller may be such, under certain conditions, as to impose destructive torques on the shaft.

It is an object of the present invention to provide a novel apparatus for determining, and preferably directly indicating, the power being transmitted by a shaft.

Another object of the invention lies in the use of one or more beams of light in solving such problems and in the modulation thereof in response to shaft speed and/or torque.

In the preferred embodiment of the invention, one or more light beams are modulated in response to changes in torque in the shaft, and are used to establish a corresponding series of undulations which may be used in torque determination, or which may be combined or reacted with, or electrically multiplied by, another electric variation responsive to speed of the shaft to obtain power determinations, and the provision of such systems is an object of the present invention.

It is often desirable to torque-modulate two light beams differentially, and it is an object of the present invention to do this either in a torque-determinative or power-determinative system.

Further objects of the invention lie in the novel apparatus for light modulation and in the novel electrical circuit arrangements employed, all irrespective of employment in torque-responsive or power-responsive systems. These circuit arrangements include a novel electrical multiplying system giving a reading of the product of two electric variations.

Further objects and advantages of the invention will be made evident to those skilled in the art from the following description of a preferred embodiment of the invention.

Referring to the drawing:

Figures 1 and 2 diagrammatically illustrate individually a wiring diagram and a preferred embodiment of the light-modulation means and, taken together, show very diagrammatically the primary features of the principal embodiment of the complete invention;

Figure 3 is a vertical sectional view of the shaft and one shutter, taken as indicated by the line 3—3 of Figure 2;

Figures 4 and 5 are diagrammatic views illustrating one embodiment of the light-modulation means;

Figure 6 is a diagrammatic view illustrating an alternative light-modulation means;

Figures 7 and 8 illustrate diagrammatically a further embodiment of a light-modulation means employing a single light beam; and Figure 9 is a face view of a direct-reading meter which can be employed with the invention.

In general, the invention involves determination of torque or horsepower by employment of a light beam directed substantially longitudinally along, but spaced from, a portion of the shaft periphery. This light beam is modulated by suitable means. For example, it can be partially or completely interrupted at a frequency proportional to shaft speed and it can be modulated in intensity in response to the torque in the shaft. The resulting light beam can be translated into a visible indication representing the actual torque in the shaft. In the preferred embodiment, the modulated light beam is translated into corresponding electric undulations which are, in effect, "multiplied" by another electric variation which varies substantially proportionally to shaft speed to obtain a product which represents the actual power transmitted by the shaft.

Within the scope of this invention, any one of a large number of means can be used for forming, modulating, or controlling the light beam, and any one of a number of different variants can be employed for utilization of the modulated beam in giving a desired indication, for example, through translation into corresponding electric undulations and using these in themselves or compared with other undulations to secure a representation of torque or horsepower transmitted. However, I choose to describe, as a preferred embodiment, a system employing two differentially-modulated light beams, together with an electrical system controlled thereby, to produce an indication of horsepower. Such a system is shown generally in Figures 1 to 3, inclusive, which will be described specifically without intent to limit the invention to this embodiment.

Referring particularly to Figure 2, the rotating shaft is indicated by the numeral 10 and turns about an axis A—A, being used for transmitting power from one position to another. The torque transmitted by this shaft results in a proportional twist thereof and the invention, in effect, measures the twist between two positions spaced along the shaft.

Fixed to the shaft at one of these positions is a shutter 12, best shown in Figures 2 and 3 as comprising light-impeding blades or teeth 13 separated by light-transmitting spaces 14. The number of teeth is not critical but these teeth should preferably be spaced equally around the periphery of the shutter 12. A collar member 15 surrounds the shaft 10 and is fixed thereto in an adjustable manner, as by employment of a set screw 16. This collar member serves as a convenient means for fixing the shutter 12 to the shaft 10 and small screws 17 are shown in this capacity.

The collar member 15 provides a generally conical reflecting surface 18 adapted to receive light rays from a source 19 after passage through a lens 20 and an aperture plate 21, and serves to reflect these light rays in a direction which is generally along, but spaced from, the periphery of the shaft 10. The reflecting surface 18 may be merely a highly polished steel surface, though it is preferred to coat the corresponding angular surface of the collar member 15 with a coating of reflecting material, such, for example, as polished chromium or vapor-deposited aluminum, to provide a good front-surface reflector.

In the illustrated embodiment, the aperture plate 21 provides rectangular apertures 22 and 23 which are usually disposed in alignment in a radial plane extending outward from the axis A—A but which, in the diagrammatic showing of Figure 2, are shown turned slightly from this position for purpose of clarity. The function of this aperture plate is to produce two downwardly-directed beams of light 25 and 26, indicated in Figure 2 by their central rays and indicated in Figure 4 by white rectangles. These beams of light impinge against the reflecting surface 18 at peripherally spaced positions separated by a distance substantially corresponding to the distance between spaces 14 of the shutter 12. The reflected beams 27 and 28 are indicated in Figure 2 by their central rays and, in Figure 4, by shaded portions correspondingly numbered. The maximum width of the reflected beams 27 and 28 in a horizontal plane will be determined by the width of the spaces 14 of the shutter 12, and the downwardly-extending beams 25 and 26 may be of substantially equal width or may be of somewhat greater width. In both instances, however, each of the beams may be slightly converging or slightly diverging. If it is desired to collimate the rays in such a beam, this may be accomplished by a suitable condensing lens system adjacent the source 19 or by use of a lens means 30 through which pass the reflected beams 27 and 28, and which lens system may also be used to focus the rays or form a reflected beam which is of the same width at the shutter 12 as at a second position along the shaft. Due to the fact that the two vertical beams 25 and 26 impinge against the reflecting surface 18 at slightly spaced peripheral positions, the reflected beams 27 and 28 will usually diverge slightly from each other, as suggested in Figure 4.

Means is provided at such second position along the shaft 10 for differentially modulating these reflected light beams 27 and 28 in response to torque in the shaft. In the preferred embodiment, this means may include a second shutter 31 at this second position and providing light-impeding portions in the form of blades or teeth 32 (see Figure 4) and light-transmitting portions in the form of light-transmitting spaces 33. In the preferred embodiment, the shutter 31 is substantially identical in shape with the shutter 12, and its angular relationship with the shutter 12 is best shown in Figure 4, which illustrates this angular relationship under a condition of zero torque in the shaft 10. Under such conditions, one of the blades 32 interrupts, blocks, or absorbs a portion of the reflected beam 27 and transmits a portion of this beam, the transmitted portion being hereinafter referred to as a modulated light beam and being indicated in Figure 4 by the numeral 35. Similarly, another of the blades 32 interrupts, blocks, or absorbs a portion of the reflected beam 28 and transmits a portion of this beam, the transmitted portion representing another modulated light beam, indicated in Figure 4 by the numeral 36.

These modulated light beams are directed toward, and are reflected from, a reflecting surface 37 provided by a collar member 38 secured to the shaft 10 and to the shutter 31, as previously described with reference to the collar member 15. The upwardly-reflected rays are indicated by the numerals 39 and 40, the central rays thereof being shown in Figure 2 and these beams being indicated by white rectangles correspondingly numbered in Figure 4. It will be understood that the beams 39 and 40 are reflected in a radial or conical plane extending outward from the axis A—A but, for purpose of clarity, are shown diagrammatically in Figure 2 as diverging toward respective photo-cells 41 and 42 of Figure 1.

Any torque-produced twist in the shaft 10 between the shutters 12 and 31 will change the angular relationship of the shutter 31 with respect to the shutter 12. It will be apparent that a twist in one direction will increase the intensity of the transmitted or modulated beam 35, while correspondingly decreasing the intensity of the transmitted or modulated beam 36, thus producing a differential variation in intensity. This condition is exemplified in Figure 5, in which the amount of light in the modulated beam 35 is reduced while the amount of light in the modulated beam 36 is increased. A twist in an opposite direction will produce an opposite differential effect and the intensity of the transmitted or modulated beam 35 will decrease, while the intensity of the transmitted or modulated beam 36 will increase. The differential intensity will be proportional to the torque in the shaft 10 and all variations in intensity of the transmitted or modulated beams 35 and 36 will be transmitted to the photo-cells 41 and 42.

The photo-cells 41 and 42, respectively receiving the modulated light of the beams 35 and 36, serve to translate these beams into corresponding electric undulations which are preferably amplified by being transmitted to grids 43 and 44 of a double triode 45 providing a filament means 46 and plates 47 and 48. The filament means 46 is energized from a battery A or from any other suitable source, and a battery C or other bias means serves to apply an appropriate bias potential to the grids 43 and 44 and to supply an operating potential for the photo-cells 41 and 42.

The plate currents or potentials of the plates 47 and 48 represent amplified electric undulations corresponding to the undulations of the modulated light beams 39 and 40, respectively, and these currents or potentials are preferably balanced against each other to obtain a net undulation. This may be accomplished in any one of a number of ways, as by employment of a Wheatstone bridge circuit, by differentially connecting these potentials, etc. In the preferred embodiment, the plates 47 and 48 are connected to conductors 49 and 50, between which are connected series-connected impedances 51 and 52 providing a common terminal 53. In addition, these conductors 49 and 50 extend to a center-tapped armature means 54 of a meter 55 comprising one embodiment of an electric multiplying device. The armature means 54 is pivoted to move about its vertical axis by pivot pins 56 and 57 in suitable jewel bearings (not shown), the pivot pin 56 carrying a pointer 58 moving adjacent a scale 59 (see Figure 9) calibrated directly in horsepower. The conductor 50 is connected to the pivot pin 56 through a spiral spring 60, and this pin is connected by a conductor 61 to one end terminal of the armature coil. Similarly, the conductor 49 is connected through a spiral spring 62 to the pivot pin 57, and thence to the other end terminal of the armature coil. An insulating sleeve 63 surrounds the pivot pin 57 and is, in turn, surrounded by a conducting sleeve 64 connected by conductor 65 to the mid-tap of the armature coil. A spiral spring 66 electrically connects this mid-tap to a conductor 67 extending to the common terminal 53 and to the positive terminal of a battery B. The B-potential supplied to the plate 47 traverses conductor 49, spring 62, pivot pin 57, one-half of the armature coil, sleeve 64, spring 66, and conductor 67. The B-potential supplied to the plate 48 traverses conductor 50, spring 60, pivot pin 56, one-half of the armature coil, sleeve 64, spring 66, and conductor 67. The magnetic fields established by the two halves of the armature coil are in opposition. Correspondingly, if the plate current controlled by the modulated light beam 39 exceeds the plate current controlled by the modulated light beam 40, the armature means 54 will produce a net magnetic field, with the flux in one direction while, if a reverse condition exists, the net magnetic field will produce a flux in the opposite direction.

If the armature means 54 is placed in a unidirectional constant-intensity magnetic field, supplied, for example, by a field member 70, the system thus far described can be made to indicate torque, as will be apparent from the description of the mode of operation hereinafter set forth. However, in the preferred embodiment illustrated, and in which a direct reading of horsepower is obtained, I prefer to establish a variable-intensity magnetic field in which the armature is positioned, this field varying in intensity with the speed of revolution of the shaft 10. In this way, the field produced by the field member 70 reacts with the net field produced by the armature means 54 in such way that the hand or pointer 58 moves through an angular distance which is proportional to the product of torque and revolutions per minute, thus being capable of a direct indication of power transmitted through the shaft 10. One manner of accomplishing such a variation in field strength substantially proportional to shaft speed and between the pole pieces of the field member 70 is shown diagrammatically in Figures 1 and 2 and will now be described.

Referring particularly to Figure 2, an auxiliary light source 72 produces light which is formed into a beam, as by a lens 73 and the aperture of an aperture plate 74, this beam being directed vertically upward toward the reflecting surface 18, the center line of this beam being indicated by the numeral 75. This beam is reflected as a beam 76 and is controlled by passage through the shutter 12. This beam is again reflected by a stationary reflecting means 77 mounted on a support 78 to produce a reflected beam 79 directed toward a photo-cell 80. As the shaft 10 turns, the successive teeth 13 and spaces 14 of the shutter 12 serve to split up the constantly-reflected beam into a series of reflected beams which are reflected to the photo-cell 80 at a frequency which is directly proportional to the speed of the shaft 10. The photo-cell 80 translates these light impulses into corresponding electric undulations which are supplied through conductors 81 and 82 to the input of an amplifier 83, there being an energizing battery 84 in this input circuit. This amplifier is of a type capable of producing an output which is substantially proportional to the frequency of input. Such amplifiers are sometimes known in the art as inverter amplifiers. In Figure 1 is shown a circuit diagram for one embodiment of such an amplifier, described in detail in Henney, "Electron Tubes in Industry," (1934), page 209. This circuit will produce an output current substantially proportional to the input frequency and which does not vary substantially with changes in input potential. The latter feature is desirable in the invention inasmuch as it precludes undesirable variations due to minor changes in light intensity of the source 72, as produced, for example, by a change in the applied potential or a gradual decrease in intensity of the source with use.

The electric undulations from the photo-cell 80 represent, in effect, an interrupted direct current which is supplied to the input of the amplifier 83. With the double-tube type of amplifier disclosed, the output represents, substantially, a uni-directional current which varies in intensity with the frequency of the input undulations. This uni-directional output is transmitted through conductors 87 and 88 to an energizing winding 90 surrounding the field member 70. Such a field member 70 establishes an electro-magnetic field traversing the armature means 54, though it should be understood that an air-core system can be employed for establishing this field through energization of the winding 90 rather than the magnetic-member-core type of field shown in Figure 1.

The mode of operation of the embodiment shown in Figures 1 and 2 is as follows. The two downwardly-directed light beams 25 and 26 are constantly delivered to the reflecting surface 18 and are reflected constantly therefrom toward the shutter 12. However, as this shutter rotates with respect to the reflected beams, the teeth 13 will sequentially interrupt the reflected beams so that the beams 27 and 28 moving toward the shutter 31 are, in effect, pulsating. In the illustrated embodiment, both of these reflected beams will be cut in substantially simultaneously and will be cut off substantially simultaneously. If desired, the beams 25 and 26 may be synchronously interrupted so as to move toward the reflecting surface 18 only when the reflected beams 27 and 28 will "fill" the spaces or slots 14 in a manner suggested in Figures 4 and 5. On the other hand, it is simpler to direct the beams 25 and 26 continuously toward the reflecting surface, in which event these spaces or slots 14 are only partially "filled" in varying degree with the reflected beams preparatory to and after the "full" beam position suggested in Figures 4 and 5. Correspondingly, the width of the reflected beams 27 and 28 in a horizontal direction will vary and the quantum of light in the modulated beams 35 and 36 will vary in an undulating manner even under a zero torque condition. However, the integrated quantum of light in the modulated beam 35 will be equal to the integrated quantum of light in the modulated beam 36 under conditions of zero torque, but these values will change differentially in response to increased torque and this differential variation will be directional.

The undulating modulated beam 39 reflected to the photo-cell 41 acts to establish corresponding undulations in the plate circuit of the triode by the action of the grid 43, which controls electron flow from the filament means 46 to the plate 47. A corresponding undulating current will thus appear in one half of the winding of the armature means 54. At the same time, the photo-cell 42 will translate the light undulations in the modulated reflected beam 40 into corresponding electric undulations which are applied to the grid 44 to control the electron flow from the filament means 46 to the plate 48, and corresponding electric undulations will thus appear in the other half of the winding of the armature means 54. The two currents in the respective halves of this armature means tend to establish electromagnetic fields in opposite directions. Correspondingly, if the instantaneous or integrated plate currents are equal, there will be no net electromagnetic field developed by the armature means. However, an unbalance in one direction will establish a net electric field in one direction which is substantially proportional to the unbalance, and an unbalance in the other direction will establish a net electric field in the opposite direction which, again, is substantially proportional to the unbalance.

It will be recognized that the currents delivered to the two halves of the armature means 54 are pulsating so that such net electromagnetic fields produced by the armature means will also be of a pulsating character. Such pulsations will occur at a frequency proportional to the speed of the shaft 10. It will also be apparent, however, that the armature means 54 is disposed in an electromagnetic field having a flux density which is substantially proportional to shaft speed. If no net field is being produced by the armature means 54 due to current therethrough, there will be no deflection of this armature means and the meter 55 will indicate a condition of zero horsepower, representing zero torque in the shaft 10. However, as soon as a net field is produced by the armature means 54, this field reacts with the electromagnetic field produced between the poles of the field member 70 and causes the armature means 54 to turn to give an indication of the actual power transmitted by the shaft 10. Any resulting tendency of the armature to vibrate under the pulsations of the net electric field can be damped by conventional means so that the pointer 58 of the meter does not substantially vibrate at a corresponding frequency.

It will be clear that the elements of the system are shown only diagrammatically in Figures 1 and 2. For example, no attempt has been made to show accurately the structural details of the meter 55. In practice, conventional pole pieces are employed to bound the armature space and other refinements are employed which, for purpose of simplicity, are not herein-shown. The meter 55 may be a conventional dynamometer-type meter, modified by addition of the spring 63, the sleeve 64, etc., to provide a center tap for the usually-continuous winding of the armature.

Similarly, no attempt has been made to show accurately the exact shape of the various elements, particularly those of the lens system. It will be understood that the lenses 20 and 73 may be of the collimating type to produce parallel-ray beams or spherical lenses can be employed, particularly if the lens means 30 is used. This lens means may serve as a collimating means or it may be employed to control the size of the light beams at the shutter 31 to make these sizes substantially correspond to those adjacent the shutter 12 in the event that the shutters are of identical construction. It will be apparent also that various changes can be made in the electrical circuit disclosed through employment of other means for amplifying and/or balancing the electric undulations against each other to produce a net undulation, and that the battery-energized triode circuits can be energized from other sources. Diagrammatically, Figure 1 also shows the light sources 19 and 72 as being energized from the battery A through a switch 92, but other energizing sources can be employed without departing from the spirit of the invention.

In the embodiment of the invention shown in Figures 1 and 2, the light beams 25 and 26 are reflected to be transmitted through adjacent slots or spaces 14 of the shutter 12 but it will be clear that the beams can be more widely separated or, as suggested in Figure 6, the beams can be brought closer together so as to be under the control of, and pass through, the same space 14. In the latter instance, the light beams reflected from the reflecting surface 18 will be partially absorbed and partially transmitted by adjacent teeth 13 and, in addition, the transmitted portions of the beams will be further modulated by adjacent teeth 32 and the intervening space 33 of the shutter 31. In this connection, the shutter 31 will serve partially to absorb and partially to transmit the beams and any torque in the shaft 10 will differentially change the transmitted portions.

Another modification which can be made in the embodiment suggested in Figures 2, 4, and 5 is to bring the adjacent boundaries of the two vertical beams 25 and 26 closer together, even to the extent of meeting, to form a single rectangular beam which reaches and is reflected from the reflecting surface 18. In the latter connection, the total width of the reflected beam in a horizontal plane may be such as to cover completely two of the adjacent teeth 13 and the intervening space.

It will be understood, also, that it is not always necessary to employ two differentially-modulated light beams and that a single beam can be utilized. For example, if one of the beams of Figure 2 is blocked and the other remains modulated in response to torque, corresponding electric undulations will appear in one half of the winding of the armature means 54 and reactive electromagnetic fields will be established in the meter 55 to cause deflection of the pointer 58. Modulation of the single light beam will change the intensity of the field produced by the armature means 54 so that, by use of a differently calibrated scale on the meter 55, the system will still indicate power transmitted by the shaft 10.

Figures 7 and 8 show another method of modulating a single beam in which the shutters 12 and 31 are relatively shifted in an angular position so that, as shown in Figure 7, a tooth 13 on the shutter 12 is longitudinally aligned with a space 33 of the shutter 31 under conditions of zero torque. Thus, the tooth 13 and the tooth 32 operate alternately to block the reflected beam and prevent any passage of light to the receptive photo-cell when there is no torque in the shaft. Correspondingly, there will be no electric undulations delivered to the armature means of the meter 55 under such conditions of zero torque. However, as suggested in Figure 8, as soon as the shutter 31 is angularly shifted with respect to the shutter 12 in response to appearance of torque in the shaft 10, this complete blocking action is modified to permit transmission of light to the photo-cell in proportion to the torque. For example, if the receptive tooth 32 of the shutter 31 is displaced in one direction, it will permit a fractional portion of the beam to be transmitted past an edge 100 thereof to reach the photo-cell. A torque in an opposite direction would displace this receptive tooth 32 in an opposite direction and would permit a fractional portion of the beam to be transmitted past an opposite edge 101 to reach the photo-cell. If a non-directional torque indication is desired, both of such fractional transmitted portions can move to the same photo-cell, but if directional indications are desired, these fractional transmitted portions can move to separate photo-cells, e. g., those indicated by the numerals 41 and 42.

It will also be clear that the invention can be employed to determine or indicate torque in the shaft 10, rather than power transmitted thereby. For example, any of the previously-described torque-modulated systems can be used to energize the armature means 54 while disposed in an electromagnetic field which is either constant (as, for example, if the field member 70 is a permanent magnet) or pulsating at a frequency determined by the speed of rotation of the shaft 10. In the latter instance, the output of the photo-cell 80 can be supplied to the winding 90 around the field member 70 without amplification, or a conventional amplifier can be used to establish a pulsating field which does not vary in intensity with speed but the frequency of which is determined by shaft speed. It will be noted that the power-indicating system of Figures 1 and 2 acts, in effect, to multiply electrically torque and speed to produce a reading of power, but either a torque-responsive or a speed-responsive system can be employed individually to give, respectively, indications of torque or speed of the shaft 10. Also, in the complete system, it should be understood that various other speed-responsive means can be used with the torque-modulation means, and that various torque-modulated means employing one or more light beams can be employed with the speed-responsive means herein-disclosed without departing from the spirit of the invention.

While the complete system of Figures 1 and 2 discloses a separate light beam for the speed-responsive system, e. g., the light beam 75, the invention contemplates also the possibility of employing in this connection a light beam derived from the source 19, for example, one of the reflected beams 27 and 28. For example, the reflector 77 can be disposed in one of these beams, the other being modulated in response to torque by the shutter 31, or the reflector 77 may be thus disposed and present a semi-mirrored surface to reflect a portion of the beam and transmit another portion.

It should be apparent, also, that it is not essential to use shutters 12 and 31 which provide as many teeth and spaces as are shown. A lesser number of teeth or spaces will produce undulations of lower frequency delivered to the meter 55 and the number of such teeth can be modified, even to the extent of using only one or two teeth on each shutter, without departing from the spirit of the invention.

In speaking of modulation of the intensity of a light beam, I have reference either to a change in light density in a beam of substantially constant dimensions or, as in the preferred embodiment, a change in intensity as produced by a light beam of substantially constant light density but varying in size or quantum of light. While the preferred embodiment of the invention employs a shutter providing opaque and transparent portions, it is quite apparent that such portions on one or both shutters may be semi-opaque and semi-transparent or may vary in density around the periphery of the shaft in an undulating manner.

Various other changes and modifications will be apparent to those skilled in the art from the description and diagrammatic showing herein-given, and it is intended that the invention be construed broadly to cover such alternative structures as are comprehended in the spirit of the appended claims.

I claim as my invention:

1. In a torque-responsive system for determining the torque acting to produce a twist in a shaft, the combination of: a substantially conical reflecting surface mounted on and concentric with the axis of said shaft; means for directing a pair of light beams toward said reflecting surface with axes aligned in a plane perpendicular to the shaft axis to be reflected in a direction along said shaft, the reflected beams diverging slightly from each other; light-sensitive means in the path of each reflected light beam; and means in the light path between said reflecting surface and said light-sensitive means for differentially varying the amount of said light in the two reflected beams reaching said light-sensitive means in response to a change in torque transmitted by said shaft.

2. In a torque-responsive system for determining the torque acting to produce a twist in a shaft, the combination of: a substantially conical reflecting surface mounted on and concentric with the axis of said shaft; means for directing light toward said reflecting surface to be reflected with diverging side boundaries in a direction along said shaft, said means including a first shutter secured to said shaft at one position and providing a light-impeding portion and a light-transmitting portion successively traversing said reflected light as said shaft rotates to direct the light with diverging side boundaries intermittently along said shaft, said light-transmitting portion providing two edges spaced circumferentially from each other for determining said diverging side boundaries of the reflected light; a second shutter secured to said shaft at another position and disposed in the path of the reflected light passed by said first shutter, said second shutter providing light-impeding means having two edges spaced circumferentially from each other and each bounding a light-transmitting space of said second shutter, these edges being spaced from each other a distance less than the distance between the diverging side boundaries of the reflected light whereby the reflected light is formed into two differentially-varying beams, the first beam increasing and the second beam decreasing upon increase in torque in said shaft and the first beam decreasing and the second beam increasing upon decrease in said torque; and means responsive to the relative amount of light in these differentially-varying beams.

3. In a torque-responsive system for determining the torque acting to produce a twist in a shaft, the combination of: a conical member carried by said shaft to rotate therewith and providing a substantially conical reflecting surface concentric with the axis of said shaft; means for directing light toward said reflecting surface to be reflected in a direction along said shaft; a first shutter secured to said shaft at one position and providing circumferentially-spaced openings with intervening blades successively traversing said reflected light as said shaft rotates to form an intermittent beam directed along said shaft; a second shutter secured to said shaft at another position and providing circumferentially-spaced openings with intervening vanes and disposed in said intermittent beam to partially transmit and partially impede same and to change the ratio of transmitted to impeded light in response to a twist of said shaft between said positions; a second conical member carried by said shaft to rotate therewith and providing a second substantially conical reflecting surface concentric with the axis of said shaft at a position beyond said second shutter to receive and reflect said transmitted light from said second shutter; and light-responsive means in the path of this reflected light responsive to a change in the amount of light transmitted by said second shutter.

4. In a torque-responsive system for determining the torque acting to produce a twist in a shaft, the combination of: means for directing two beams of light longitudinally along the periphery of said shaft and substantially equidistant from the axis thereof from one position to another position, said means including a reflecting surface adjacent the periphery of said shaft, means for directing light thereto, and an aperture means for defining the boundaries of said beams; means for differentially impeding and transmitting said light beams at said second position in response to a change in twist of said shaft by increasing and decreasing respectively the transmitted portions of said beams upon increase in twist of said shaft and decreasing and increasing same respectively upon decrease in twist of said shaft; a first photo-cell receiving the transmitted light of one of said beams; a second photo-cell receiving the transmitted light of the other of said beams; an indicating means; and circuit means connecting said indicating means and said first and second photo-cells.

5. In a torque-responsive system for determining the torque in a shaft, the combination of: first and second shutters mounted on said shaft at axially spaced positions therealong, each of said shutters providing a plurality of light-transmitting spaces disposed equidistant from the axis of rotation of said shaft and providing light-impeding portions separating said light-transmitting spaces; means for directing light toward said first shutter in a manner to produce two light beams masked by boundaries of adjacent light-transmitting spaces of said first shutter and directed toward said second shutter to be partially transmitted and partially impeded by the light-transmitting spaces and light-impeding portions of said second shutter to produce two modulated beams of light; photo-cell means in the path of light transmitted by said second shutter; and means operatively connected to said photo-cell means and responsive to a change in the relative amount of light in said modulated beams.

6. In a torque-responsive system for determining the torque in a shaft, the combination of: a shutter mounted on said shaft and providing a plurality of circularly disposed light-impeding elements separated by light-transmitting spaces; a light source; means for masking the light from said source to form two light beams directed toward said shutter and generally along the periphery of said shaft at a position substantially equidistant from the axis of said shaft, said light beams being so spaced with respect to said shutter that beams of light pass simultaneously through adjacent light-transmitting spaces of said shutter; means axially spaced from said shutter for differentially modulating said light beams in response to torque in said shaft; and means responsive to the differentially modulated light beams.

7. In combination in a device responsive to changes in torque in a shaft: a substantially conical reflecting surface concentric with the axis of said shaft; means for directing light toward said reflecting surface and for forming two reflected beams disposed side by side along the periphery of said shaft and substantially equidistant from the axis of said shaft, said reflected beams diverging slightly from each other, said means including a first shutter secured to said shaft at one position and providing two circumferentially-spaced beam-bounding edges for respectively determining those side boundaries of the beams which are farthest from each other; a second shutter secured to said shaft in the path of the light beams moving through said first shutter, said second shutter providing two beam-bounding edges spaced closer together than said side boundaries of said beams to impede a portion of each beam and transmit another portion of each beam whereby a twist in said shaft between said shutters increases the light in the transmitted portion of one beam and decreases the light in the transmitted portion of the other beam; and means responsive to the relative amounts of light in the transmitted portions of the two beams.

DONALD K. ALLISON.